United States Patent

[11] 3,563,572

| [72] | Inventor | David Walter French<br>Somerville, N.J. |
|---|---|---|
| [21] | Appl. No. | 835,592 |
| [22] | Filed | June 23, 1969 |
| [45] | Patented | Feb. 16, 1971 |
| [73] | Assignee | Johns-Manville Corporation<br>New York, N.Y. |

[54] COMPOSITE COUPLING FOR INSULATED HIGH TEMPERATURE FLUID CARRYING CONDUITS
19 Claims, 2 Drawing Figs.

[52] U.S. Cl................................................. 285/47,
285/369, 285/351; 138/149
[51] Int. Cl................................................... F16l 59/16
[50] Field of Search........................................... 285/47, 54,
369, 53, 55(Cryogenic Digest), 48, 302
(Cursory), 351; 138/149

[56] References Cited
UNITED STATES PATENTS

| 2,610,028 | 9/1952 | Smith | 285/55X |
| 3,369,826 | 2/1968 | Boosey et al. | 285/369X |
| 3,492,029 | 1/1970 | French et al. | 285/47 |

FOREIGN PATENTS

| 447,735 | 3/1968 | Switzerland | 285/47 |

*Primary Examiner*—Thomas F. Callaghan
*Attorneys*—John A. McKinney and/or Robert M. Krone ABSTRACT: Thermal insulated fluid carrying conduit composed of concentric lengths of pipe spaced apart from each other by intermediate insulating material, having assembled thereon a push-in composite coupling unit providing a male type linkage for cooperating union with a corresponding female type linkage on an adjacent section of such a conduit which upon simple insertion joining, forms a slip joint connection uniting and fluid sealing each of the adjacent concentric pipes with their respective counterparts and which also provides a thermal expansion joint.

PATENTED FEB 16 1971
3,563,572
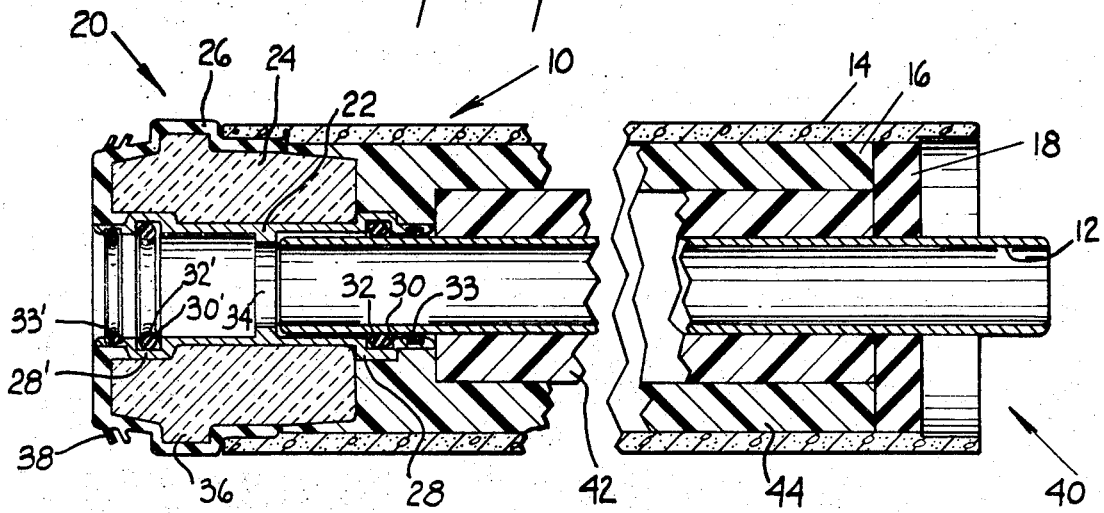
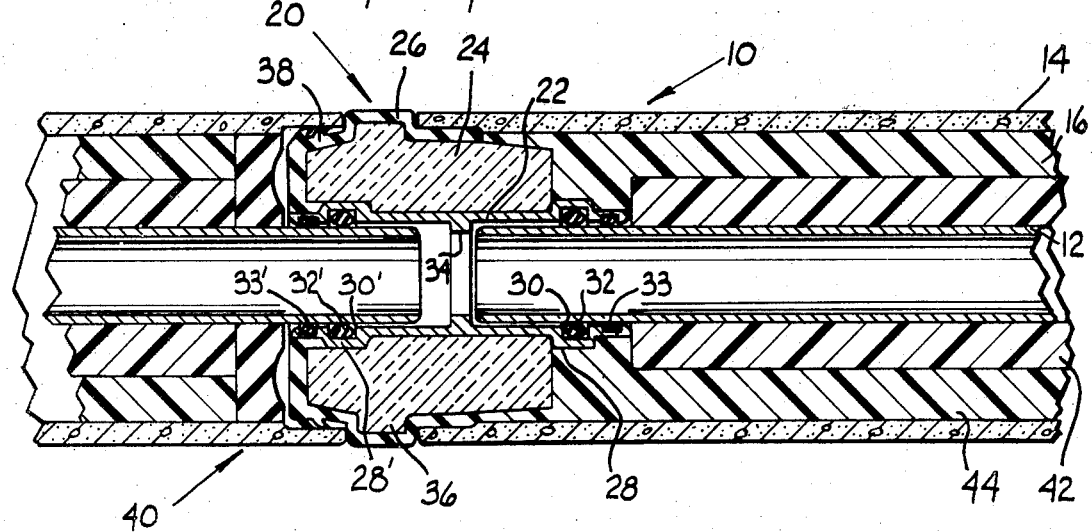
INVENTOR.
DAVID WALTER FRENCH
BY John A. McKinny
ATTORNEY

COMPOSITE COUPLING FOR INSULATED HIGH TEMPERATURE FLUID CARRYING CONDUITS

BACKGROUND OF THE INVENTION

This invention relates to insulated fluid carrying conduits wherein the insulation constitutes an integral part of the unit being factory constructed or prefabricated, for use in transporting liquids at high or low temperatures, which is especially designed for subterranean emplacement such as in buried hot or cold water, and heat distributing systems. The invention is specifically directed to thermal insulated fluid carrying conduits constructed of concentric lengths of an inner fluid carrying pipe and an outer protective pipe spaced apart from each other with intermediate thermal insulation substantially along their common lengths, such as described in my copending application for Pat. Ser. No. 787,286 filed Nov. 18, 1968 for Thermally Insulated Pipe, and provides an improved composite coupling unit therefor.

SUMMARY OF THE INVENTION

This invention comprises an improved composite coupling unit comprising an assembly of components on a fluid carrying insulated conduit of concentric lengths of pipe providing a male type linkage for a cooperative union in a slip joint with a corresponding female type linkage on an adjacent like section of fluid carrying insulated conduit whereby such adjacent sections are facilely joined and sealed in overall fluid tight relationship between both the inner fluid carrying pipe and the outer protective pipe respectively, simply by a forced push-in operation of interposing the end of one section within the end of the other.

It is the primary objective of this invention to provide an improved coupling for fluid carrying insulated conduits composed of concentric lengths of pipe having intermediate thermal insulation substantially along their common connection and a thermal expansion joint, will endure high temperatures and is effected simply through a slip together union and manipulation thereby eliminating the need for tools or involved procedures such as welding or bolting in installation, and costly expansion compensating measures such as expansion loops, etc.

BRIEF DESCRIPTION OF THE DRAWINGS

FIG. 1 is a view partially in cross section of a fluid carrying insulated conduit composed of concentric lengths of pipe having the composite coupling of this invention assembled as a unit on one end thereof; and FIG. 2 is a fluid sealing and sliding expansion joint formed between sections of such fluid carrying insulated conduit through means of a composite coupling of this invention.

DESCRIPTION OF THE PREFERRED EMBODIMENT

Referring to the drawings, the fluid carrying insulated conduit 10 is essentially composed of concentric lengths of pipe consisting of inner fluid carrying pipe 12 and outer protective pipe 14 spaced apart from each other by intermediate thermal insulating material 16 substantially along their common lengths. Annular plug seal 18 of elastic material is preferably employed at one end of the conduit inserted within outer pipe 14 and in surrounding relationship about inner pipe 12 so as to bridge the space between the concentric pipes and seal the same to protect the insulating material 16 from penetration by fluids. It is required that the plug seal 18 be located recessed inwardly from the terminal ends of both inner pipe 12 and outer pipe 14 as illustrated for cooperation with the composite coupling unit of this invention as will become evident in the hereinafter description of its construction and function wherein this end construction provides a female type linkage for cooperating union with a male type linkage provided by the composite coupling unit of the invention.

The composite coupling 20 is composed of an assembled unit including the combination of a tubular sealing sleeve 22, lock block 24 of substantially rigid or nonelastic high temperature thermal insulating body, and an elastic annular end cap seal 26, all assembled as a composite unit in generally successive concentric and superimposing arrangement in relation to each other, providing a mechanical means for a push-in union between sections facilely effected simply by interposing one end of the conduit with the opposite end of a like section which forms a sealed slip joint of high temperature resistance permitting free reciprocating movement of the inner fluid carrying pipe in the direction of its longitudinal axis in response to thermally induced expansion or contraction.

The tubular sealing sleeve 22, preferably constructed of bronze, stainless steel or the like relatively corrosion resistant metal or dense and durable plastic, comprises a generally tubular section of slightly larger internal diameter than the outside diameter of the inner fluid carrying pipe 12 to enable the sleeve to be slipped over the terminal end of pipe 12 in telescoping arrangement and to encompass the end for a substantial length providing ample area for the interposition of sealing rings. Sleeve 22 is constructed of a configuration providing a pair of external radially protruding annular flanges 28 and 28' which are preferably formed with corresponding recesses within the interior of the sleeve as shown as 30 and 30' to provide seats for sealing rings such as a pair of sealing rings 32 and 32'. In the preferred embodiment of the invention, a second pair of sealing rings 33 and 33' are included within sleeve 22, seated in appropriate recesses, and each is located outwardly towards the respective ends of the sleeve from the aforementioned sealing rings 32 and 32' seated in recesses 30 and 30'. The functions of these dual pairs of rings will be discussed hereinafter. Also in the preferred embodiment, sleeve 22 is provided with an interior protruding annular flange 34, or alternatively several lugs spaced annularly apart located approximately intermediate the sleeve length to provide a stop for the terminal end of inner fluid carrying pipe 12 of the section of conduit 10 carrying the preassembled coupling 20.

Lock block 24, composed of a generally rigid or nonelastic high temperature insulating body, annularly surrounds tubular sealing sleeve 22 substantially along its length and is fixed in its position thereon by having a section of its body surrounding the sleeve extending intermediate the pair of exteriorly protruding annular flanges 28 and 28' which inhibit lateral sliding movement. Lock block 24 comprising a generally cylindrical body is of a circumference less than that of the interior of the outer protective pipe 14 to permit the interpositioning of a section thereof into the end of pipe 14. Lock block 24 is also provided with an exteriorly projecting annular flange section 36 about its periphery generally intermediate its body to form a stop which abuts the terminal end of outer protective pipe 14 fixing a limit upon upon the extent the lock block may be inserted therein. The lock block 24 is preferably constructed of two corresponding semicylindrical sections, or several arcuate sections assembled into a cylindrical unit, to facilitate fabrication of the coupling, but can be cast as a monolithic body about the sleeve if appropriate. Its composition may be composed of any substantially rigid or noncompressible thermal insulating material capable of enduring the temperature of contemplated service, preferably for example it is constructed of cast and bonded expanded perlite particles, but may comprise materials such as cast and bonded diatomaceous earth, hollow spheres of silica or alumina, expanded vermiculite, rigid bonded fibrous bodies, lightweight aerated or filled hydraulic cement, low density hydrated calcium silicate, 85 percent magnesia, cellular glass, porous fired clay and the like more or less rigid noncompressible type thermal insulating materials.

Superimposed over a substantial portion of the outer surface of the said lock block 24 is the elastic annular end cap seal 26 which surrounds and abuts in sealing relationship the tubular sealing sleeve 22 at approximately its outermost end and extends radially outwardly therefrom covering the outer end of the body of the lock block 24 and then continues back over the outer peripheral surface of the body of the end block following and conforming to its exterior contour. Preferably end cap seal 26 is extended over the annular flange 36 of the lock block 24 and beyond to where upon assembly of the coupling with the conduit it will enter within the outer protective pipe 14 a short distance and there positioned intermediate the said outer pipe 14 and the periphery of the block 24, as shown will provide a seal therebetween. Alternately the end cap seal may be terminated short of or at the annular flange 36 and a separate elastic sealing ring member may be utilized to effect the seal between the lock block 24 and the interior of the outer pipe 14. Preferably the end cap seal 26 is provided with one or more annular sealing lips 38 extending radially outward from its periphery adjacent its outer end for sealing with the inner surface of the outer pipe 14 of an adjacent section of conduit joined therewith as shown in FIG. 2.

The elastic annular end cap 26 may be composed of any appropriate elastomer type material exhibiting sufficient elastic responsive properties to provide an effective seal and which will endure the contemplated conditions such as temperature and soil contact of the designed service, for example appropriate synthetic rubbers aptly compounded and in particular ethylene propylene and silicone elastomers for the high temperature surface.

Upon assembly of the unit comprising the coupling 20 composed of the successively concentrically arranged tubular sealing sleeve 22 surrounding lock block 24 and covering elastic annular end cap seal 26 as described, the composite assembled coupling can be applied to the conduit simply by pushing the assembled unit within the end of the outer protective pipe 14 with the sleeve 22 surrounding inner pipe 12 in telescoping arrangement whereby the seals 32 and/or 33 carried in sealing sleeve 22 provide a fluid tight union thereabout and the end cap seal 26 covering lock block 24 closes off the area intermediate the sealing sleeve 22 or inner pipe 12 and outer pipe 14 blocking the entrance of fluid to the intermediate thermal insulating material. Annular flange 36 of lock block 24 either itself or as covered by elastic annular end cap seal 26 forms a stop which properly locates the coupling in relation to the conduit. As thus factory constructed or prefabricated, there is provided a section of fluid carrying insulated conduit having integral therewith a coupling which may be joined in fluid sealing relationship with an adjacent conduit section simply by means of a single push-in manipulation during field installation.

The aforedescribed coupling 20 provides a male type linkage on one end of the conduit for cooperating union in a slip joint with a corresponding female type linkage of relatively simple structure on the opposite end of a like section of conduit whereby such sections may be connected one after another through cooperating opposite end linkage as is conventional with common bell and spigot and related type cooperating pipe joints. The opposite end of the conduit for cooperating union with the coupling assembly of this invention comprises, as stated hereinbefore, an annular plug seal 18 of suitable elastic material inserted within outer pipe 14 and surrounding inner pipe 12 bridging the space between the concentric pipes and sealing the intermediate area to protect the interspersed thermal insulation from contact with fluids. A friction type seal resulting from the compression of a forced fit of a usual elastic composition will generally suffice but any conventional sealing means can be utilized. It is necessary however that the plug seal 18 be recessed inwardly from the terminal end of each pipe as shown to receive the coupling of this invention on adjacent sections of conduit.

As shown in FIG. 2, sections of conduit employing the coupling of this invention are joined simply by interposing coupling 20 of a conduit section into the opposite end 40 of an adjacent section thereof by means of a simple push-in manipulation comprising introducing the extreme exposed portion of the coupling into the outer protective pipe 14 of the end 40 of the adjacent section with the inner fluid carrying pipe 12 being received within tubular sealing sleeve 22 in telescoping arrangement. The sealing ring 30' and/or 32' of the sleeve thus embrace inner pipe 12 forming a fluid tight union with the end of inner fluid carrying pipe 12 of the adjacent section and the tubular sealing sleeve 22 bridges and joins in sealing relationship the respective fluid carrying pipe ends in a union which is free to slide in reciprocating movement in alignment with the longitudinal axis of the lengths of pipe. The elastic annular end cap 26 also formed a seal with the adjacent section of the outer pipe portion 14 whereby both concentric pipes are respectively sealed with their corresponding section. Moreover, with this coupling arrangement whereby the inner fluid carrying pipe is free to slide without disrupting the fluid tight seal, by appropriately designing the respective pipe lengths and their relative positioning to each other such as illustrated wherein the inner fluid carrying pipe is recessed inwardly in the location of the composite coupling in relation to the outer protective pipe, and on the opposite terminal end the inner fluid carrying pipe extends outwardly from the end of the outer protective pipe, the coupling of this invention also provides an effective thermal expansion joint eliminating the need for expansion loops or auxiliary expansion compensating means. In this function, it is preferred that the sealing sleeve 22 be provided with the aforementioned internal projecting annular flange 34 intermediate thereof to provide a stop for the end of inner pipe 12 of the section of conduit 10 which is preassembled with the coupling as a means of controlling the direction of expansion of said inner pipe of each section towards the opposite end to more uniformly distribute dimensional changes throughout the overall pipe line since the expansion of each section is thereby confined to one and the same direction.

Although single sealing rings such as only rings 32 and 32' within the sealing sleeve 22 will suffice, it is desired to employ two pairs of sealing rings 32 and 32', and 33 and 33' as illustrated, with each pair of respectively different design and function. For example, in the preferred embodiment of this invention the primary sealing rings 32 and 32' are composed of a stainless steel spring loaded gasket ring of trifluorinated ethylene (E. I. duPont's "TEFLON" or Allied Chemical's "HALON") wherein the spring performs as a compression member. The trifluorinated ethylene sealing ring however may require heat deformation which can be provided by exposure to the temperatures of the hot liquid carried in the conduit to effectively seat and seal it for complete sealing whereby minor leaks are possible until adequate exposure to elevated temperatures has been achieved. Thus, to prevent possible initial leakage, the inclusion of a second pair of sealing rings is expedient as illustrated by 33 and 33' in the drawings. Since the secondary seal may only be required until the unit has been exposed to high temperatures which seats the primary seals, the secondary seals may be composed of a composition designed only to endure relatively low temperatures such as ethylene propylene rubber which will perform continuously at temperatures up to in excess of about 250° F., and upon sufficiently exceeding its temperature limits, the trifluorinated ethylene compound has had sufficient exposure to effect proper seating.

As indicated hereinbefore, it is preferred that the elastic end cap seal be provided with at least one and preferably a plurality of two or three annular sealing lips 38 as illustrated, since should water or moisture penetrate the outer protective pipe 14 at a joint or other location such as through a defect and soak into the insulation, it is possible for the high temperature attributable to the liquid carried in the inner pipe to vaporize the water or moisture penetrating into the insulation cavity and build up a vapor pressure within the intermediate area. When subjected to such a vapor pressure the flexible sealing lips 38 can be designed to deflect under a given pressure, such as about 15 p.s.i.g. and thus allows the escape of the vaporized moisture. This action is in the nature of a check valve since the fins press against the inner surface of the outer protective pipe in a manner attributable to their insertion so that any exterior head of water is sealed against entry from the outside. It is also expedient to provide like sealing lips on end plug 18 to permit the same check valve effect for the escape of moisture from the other end of each section. Moreover, due to the design of the system of this invention, should water penetrate the protective casing, it is isolated within only one section of conduit and only that length of the thermal insulation can be rendered ineffective since the seals of each joint block the transmission of water along the length of the full conduit installation.

Although the fluid carrying insulated conduit 10 components may be constructed of any materials suitable for their designed needs, optimum materials for general application comprise carbon or stainless steel, copper or comparable metals for the internal fluid carrying pipe 12, and asbestos-cement or plastic pipe for the outer protective pipe 14 because of their high resistance to corrosion and soil or atmospheric conditions. The intermediate insulation 16 is preferably a composite of an inner high temperature insulation 42 such as common low density hydrated calcium silicate insulating materials, and an outer foamed resin 44 such as foamed polyurethane or polystyrene.

I claim:

1. A composite coupling for joining fluid carrying insulated conduits composed of concentric lengths of pipe spaced apart from each other having therebetween intermediate thermal insulation substantially along their common lengths, and comprising an assembled unit for an end of a section of insulated fluid carrying conduit of concentric lengths of pipe with intermediate thermal insulation which forms a male type linkage for cooperating union in a slip joint with a female type linkage on an adjacent section of another like insulated fluid carrying conduit, said composite coupling assembled unit comprising the combination of:
   a. a tubular sealing sleeve having a pair of exteriorly protruding annular flanges about its outer surface located inwardly from each end, and within said tubular sleeve a pair of annular grooves in the inner surfaces adapted to receive sealing rings and having sealing rings seated therein;
   b. lock block of rigid high temperature insulating body annularly surrounding said tubular sealing sleeve and fixed in position thereon by having a section extending intermediate the said pair of exteriorly protruding annular flanges of the tubular sealing sleeve, said lock block having an exteriorly projecting annular flange about its outer peripheral surface; and
   c. an elastic annular end cap seal superimposed over a substantial portion of the outer surface of the said lock block surrounding the tubular sealing sleeve beginning in abutting and sealing contact with the said tubular sealing sleeve and extending radially therefrom over the end of said lock block and then extending back over the outer peripheral surface of the said lock block.

2. The composite coupling of claim 1, wherein the elastic annular end cap seal of the assembled unit superimposed over a substantial portion of the outer surface of the said lock block of rigid high temperature insulating body extends over and back beyond the exteriorly projecting annular flange about the outer peripheral surface of the said lock block of rigid high temperature insulating body conforming to its contour.

3. The composite coupling of claim 2, wherein the tubular sealing sleeve of the assembly has an interiorly projecting annular flange about its inner surface located approximately intermediate its length to provide a stop for pipe inserted in telescoping arrangement therein.

4. The composite coupling of claim 3, wherein the lock block of rigid high temperature insulated body of the assembled unit is constructed in two semicylindrical sections to facilitate assembly.

5. The composite coupling of claim 3 wherein the elastic annular end cap seal is provided with at least one annular sealing lip about it its periphery intermediate its end.

6. The composite coupling of claim 5, wherein the tubular sealing sleeve of the assembled unit has two pair of seals positioned within its inner surface with two sealing rings in parallel located inwardly from each end thereof and each pair of sealing rings in combination with the tubular sleeve is adapted to receive in sealing relationship the terminal end of a fluid carrying pipe in each of the opposite ends of the tubular sleeve.

7. A thermal insulated fluid carrying conduit having a push-in composite coupling, comprising the combination of:
   a. a fluid carrying insulated conduit of an inner fluid carrying pipe and an outer protective pipe spaced apart from each other and having therebetween intermediate thermal insulation substantially along their common lengths, said fluid carrying conduit having on one end thereof a composite coupling unit which forms a male type linkage for cooperating union in a slip joint with a female type linkage on an adjacent section of another like insulated fluid carrying conduit;
   b. said composite coupling assembly on an end of the insulated fluid carrying conduit formed of an assembled unit comprising:
      1. a tubular sealing sleeve having a pair of exteriorly projecting annular flanges about its outer surface located inwardly from each end, and within said tubular sleeve a pair of annular grooves in the inner surface thereof adapted to receive sealing rings and having sealing rings seated therein, said tubular sealing sleeve surrounding the end of the inner fluid carrying pipe of the insulated fluid carrying conduit in telescoping arrangement therewith and with one of said sealing rings seated within the annular groove in the inner surface of the sealing sleeve in sealing contact with the outer surface of the said inner pipe providing a fluid tight seal therebetween;
      2. lock block of rigid high temperature insulating body annularly surrounding the said tubular sealing sleeve and fixed in its position thereon by having a section extending intermediate the said pair of exteriorly protruding annular flanges of the tubular sealing sleeve, said lock block being in part of a circumference less than that of the interior of the outer protective pipe of the insulated fluid carrying conduit, and extending into the said outer protective pipe, said lock block having an exteriorly projecting annular flange about its outer peripheral surface generally intermediate thereof providing a stop; and
      3. an elastic annular end cap seal superimposed over a substantial portion of the outer surface of said lock block surrounding the tubular sealing sleeve beginning in abutting and sealing contact with the tubular sealing sleeve and extending radially therefrom over the end of the said lock block and then extending back over the outer peripheral surface of the lock block of rigid high temperature insulating body substantially along its length to at least the said exteriorly projecting annular flange about its outer periphery.

8. The thermal insulated fluid carrying conduit with the push-in composite coupling of claim 7, wherein the elastic annular end cap seal superimposed over a substantial portion of the outer surface of the said lock block surrounding the tubular sealing sleeve extends over the outer peripheral surface of the said lock block including the said exteriorly projecting annular flange conforming to its contour and continues into the interior of the outer protective pipe of the insulated fluid carrying conduit intermediate the said outer protective pipe and the said lock block inserted therein thereby forming a seal between said components.

9. The thermal insulated fluid carrying conduit with the push-in composite coupling of claim 8, wherein the terminal end of the thermal insulated fluid carrying conduit opposite that carrying the said composite push-in coupling is provided with an annular sealing plug intermediate the concentric lengths of the inner fluid carrying pipe and the outer protective pipe and recessed back from the ends of said concentric pipes.

10. The thermal insulated fluid carrying conduit with push-in composite coupling of claim 9, wherein the elastic annular end cap seal is provided with at least one annular sealing lip about its periphery outward from its adjoining section of the assembled therewith insulated fluid carrying conduit to form a seal with the outer protective pipe of an adjacent section of such insulated fluid carrying conduit when joined therewith.

11. The thermal insulated fluid carrying conduit with push-in composite coupling of claim 10, wherein the tubular sealing sleeve of the assembly has an interiorly projecting annular flange about its inner surface located approximately intermediate its length to provide a stop for the pipe inserted in telescoping arrangement therein.

12. The thermal insulated fluid carrying conduit having a push-in composite coupling of claim 11, wherein the lock block of rigid high temperature insulated body of the assembled unit is constructed in two semicylindrical sections to facilitate assembly.

13. The thermal insulated fluid carrying conduit with push-in composite coupling of claim 12, wherein the tubular sealing sleeve of the assembled unit has two pair of seals positioned within its inner surface with two sealing rings in parallel located inwardly from each end thereof and each pair of sealing rings in combination with the tubular sleeve is adapted to receive in sealing relationship the terminal end of a fluid carrying pipe in each of the ends of the said tubular sleeve and form a seal therewith.

14. A first and second thermal insulated fluid carrying conduit joined together by means of a push-in composite coupling, comprising the combination of:
  a. a first and second section of fluid carrying insulated conduit each including an inner fluid carrying pipe and an outer protective pipe spaced apart from each other and having therebetween intermediate thermal insulating insulation substantially along their common lengths, and a terminal end of the first of said section of insulated conduit being joined to a terminal end of the second of said section of insulated conduit by means of a push-in composite coupling which provides a male type linkage on one end of the said first section of insulated conduit for cooperating union in a slip joint with a female type linkage on one end of said second section of insulated conduit;
  b. said male linkage of the composite coupling on a terminal end of the first section of insulated conduit comprising:
    1. a tubular sealing sleeve having a pair of exterior projecting annular flanges about its outer surface located inwardly from each end, and within said tubular sleeve a pair of annular grooves on the inner surfaces adapted to receive sealing rings and having sealing rings seated therein, said tubular sealing sleeve surrounding the terminal end of the inner fluid carrying pipe of the first section of insulated conduit in telescoping arrangement therewith and with one of said sealing rings seated within the annular groove in the inner surface of the sealing sleeve in sealing contact with the outer surface of said inner pipe providing a fluid tight seal therebetween;
    2. a lock block of rigid high temperature insulating body annularly surrounding the said tubular sealing sleeve and fixed in its position thereon by having a section extending intermediate the said pair of exteriorly protruding annular flanges of said tubular sealing sleeve, said lock block being in part of a circumference less than that of the interior of the outer protective pipe of the insulated conduit and extending into said outer protective pipe of the first insulated conduit, an exterior projecting annular flange about the outer peripheral surface of the lock block and generally intermediate thereof providing a stop; and
    3. an elastic annular end cap seal superimposed over a substantial portion of the outer surface of said lock block surrounding the tubular sealing sleeve beginning in abutting and sealing contact with the tubular sealing sleeve and extending radially therefrom over the end of said lock block and then extending back over the outer peripheral surface of the lock block of rigid high temperature insulating body substantially along its length to at least the said exteriorly projecting annular flange about its outer periphery;
  c. said female linkage on a terminal end of the second section of insulated conduit comprising an elastic annular plug seal inserted within the outer protective pipe and surrounding the inner fluid carrying pipe sealing the annular space between said pipes and located recessed inwardly from their terminal ends; and
  d. said male linkage of the composite coupling of the first section of insulated conduit being inserted within the outer protective pipe of the second section of insulated conduit into the recess formed by the inwardly located annular seal plug therein whereby the annular end cap seal of the first section of insulated conduit joins in sealing relationship with the outer protective pipe of the second section of insulated conduit and the tubular sealing sleeve of the composite coupling surrounds the end of the inner fluid carrying pipe of the second section of insulating conduit in telescoping arrangement therewith and with one of said sealing rings seated within the annular groove in the inner surface of the sealing sleeve in sealing contact with the outer surface of the said inner pipe of the second section of insulated conduit providing a fluid tight seal therebetween, whereby the said tubular sealing sleeve bridges and joins in sealing relationship the ends of the fluid carrying pipe of the first and second sections of insulated conduit providing a union which is free to slide in reciprocating movement in alignment with the longitudinal axis of the lengths of the first and second section of insulated conduit.

15. The first and second sections of thermal insulated fluid carrying conduits joined together by means of a push-in composite coupling of claim 14, wherein the elastic annular end cap seal superimposed over substantial portions of the outer surface of said lock block surrounding the tubular sealing sleeve extends over the outer peripheral surface of the said lock block including the said exteriorly projecting annular flange conforming to its contour and continues into the interior of the outer protective pipe of the first section of insulated fluid carrying conduit intermediate the said outer protective pipe and the said lock block interted therein thereby forming a seal between said components.

16. The first and second section of thermal insulated fluid carrying conduit joined together by means of a push-in composite coupling of claim 15, wherein the elastic end cap seal is provided with at least one annular sealing lip about its periphery to form a seal with the outer protective pipe of the second section of fluid carrying insulated conduit.

17. The first and second sections of thermal insulated fluid carrying conduits joined together by means of a push-in composite coupling of claim 16, wherein the tubular sealing sleeve of the assembly has an interiorly projecting annular flange about its inner surface located approximately intermediate its length to provide a stop for the pipe inserted therein.

18. The first and second sections of thermal insulated fluid carrying conduits joined together by means of a push-in composite coupling of claim 17, wherein the lock block of rigid high temperature insulating body of the composite coupling is constructed in two semicylindrical sections to facilitate assembly.

19. The first and second sections of thermal insulated fluid carrying conduits joined together by means of a push-in composite coupling of claim 18, wherein the tubular sealing sleeve of the composite coupling has two pair of seals positioned within its inner surface with two sealing rings in parallel located inwardly from each end thereof and each pair in combination with the tubular sleeve recedes in sealing relationship the terminal ends of the fluid carrying pipe of the first and second sections of thermal insulated fluid carrying conduit and forms a seal therewith.